United States Patent
Chung et al.

(10) Patent No.: US 8,582,833 B2
(45) Date of Patent: Nov. 12, 2013

(54) METHOD AND APPARATUS FOR DETECTING FORGED FACE USING INFRARED IMAGE

(75) Inventors: Yun Su Chung, Daejeon (KR); Sung Uk Jung, Daejeon (KR); Yongjin Lee, Daejeon (KR); Ki Young Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 924 days.

(21) Appl. No.: 12/625,427

(22) Filed: Nov. 24, 2009

(65) Prior Publication Data

US 2010/0128938 A1    May 27, 2010

(30) Foreign Application Priority Data

Nov. 25, 2008   (KR) .................. 10-2008-0117354

(51) Int. Cl.
   *G06K 9/00*   (2006.01)

(52) U.S. Cl.
   USPC ........................................ 382/118

(58) Field of Classification Search
   USPC ................. 382/117, 118, 124; 340/5.53, 5.83
   See application file for complete search history.

(56) References Cited

U.S. PATENT DOCUMENTS

2002/0136435 A1   9/2002   Prokoski
2008/0144893 A1*  6/2008   Guo et al. .................. 382/118

FOREIGN PATENT DOCUMENTS

JP   2008-181468        8/2008
KR   10-2008-0037447 A  4/2008

OTHER PUBLICATIONS

Jiangwei Li et al., "Live Face Detection Based on the Analysis of Fourier Spectra", National Laboratory of Pattern Recognition, Institute of Automation, Chinese Academy of Science, Beijing.

* cited by examiner

*Primary Examiner* — John Strege

(57) ABSTRACT

A method for detecting a forged face using an infrared image includes: acquiring an infrared image and a photorealistic image captured by one or two cameras; extracting a face region from the photorealistic image; determining, based on analysis of quality characteristics of the infrared image, whether a current face is a forged face or not; and performing face recognition on the extracted face region if it is determined that the current face is a non-forged face. The method further includes capturing an infrared image and a photorealistic image again through the camera without performing face recognition if it is determined that the current face is a forged face.

12 Claims, 4 Drawing Sheets

METHOD AND APPARATUS FOR DETECTING FORGED FACE USING INFRARED IMAGE

CROSS-REFERENCE(S) TO RELATED APPLICATION

The present invention claims priority of Korean Patent Application No. 10-2008-0117354, filed on Nov. 25, 2008, which is incorporated herein by reference.

FIELD OF THE INVENTION

The present invention relates to a method and apparatus for detecting a forged face using an infrared image, and, more particularly, to a method and apparatus for detecting a forged face using an infrared image in which a face is imaged by simultaneously using an infrared camera and a still camera, and analyze the characteristics of an input infrared image to determine whether a current face is a forged face.

BACKGROUND OF THE INVENTION

As is well known in the art, biometrics technology is the general term for methods of authenticating individual persons based on physiological or behavioral characteristics. The biometrics technology is characterized in that there is no possibility of losing biological information and there is no need to memorize such biological information. Further, biometrics technology is advantageous in that, since the biological information of an individual needs to be personally input to a system, biometrics technology is more secure than existing technology based on a password from the standpoint of security, and thus has attracted attention as the next-generation technology which will replace existing personal authentication technology based on a password and Identification (ID).

However, as the conventional biometric recognition technology progresses, a forged biological information generation technology is also developed, so that it is difficult to distinguish actual biological information from the forged biological information using typical biometric recognition algorithm. Accordingly, the reliability and security of biometric recognition are deteriorated.

Further, in conventional face recognition, when thermal distribution of a face captured by a thermal infrared camera is used, a forged face and an actual face can be easily distinguished from each other. However, since equipment such as a thermal infrared camera is very expensive, there is a limitation in actually applying such equipment to a system. Furthermore, a method of forcing a user to speak or move has a problem of inconveniencing a user.

SUMMARY OF THE INVENTION

Therefore, the present invention provides a method and apparatus for detecting a forged face using an infrared image which capture face images by simultaneously using an infrared camera and a still camera, determine whether a current face is a forged face by analyzing the characteristics of an input infrared image, and perform user authentication using a photorealistic image captured by visible light if it has been determined that the current face is not a forged face.

In accordance with an aspect of the present invention, there is provided a method for detecting a forged face using an infrared image, including: acquiring an infrared image and a photorealistic image captured by one camera or two cameras; extracting a face region from the photorealistic image; determining, based on analysis of quality characteristics of the infrared image, whether a current face is a forged face or not; and performing face recognition on the extracted face region if it is determined that the current face is a non-forged face.

In accordance with another aspect of the present invention, there is provided an apparatus for detecting a forged face using an infrared image, including: an image acquisition unit for acquiring an infrared image and a photorealistic image captured by one or two cameras; a face region extraction unit for extracting a face region from the photorealistic image; a forged face determination unit for determining, based on analysis of quality characteristics of the infrared image, whether a current face is a forged face; and a face recognition unit for performing face recognition on the extracted face region if it is determined that the current face is a non-forged face.

Accordingly, the present invention captures face images by simultaneously using an infrared camera and a still camera, determines whether a current face is a forged face by analyzing the characteristics of an input infrared image, and performs user authentication using a photorealistic image captured by visible light if it is determined that the current face is not a forged face, thus solving a plurality of problems of existing face recognition methods in which it is difficult to distinguish actual face information from forged face information, there is a limitation due to the use of expensive equipment, and a user is inconvenienced.

Furthermore, the present invention is advantageous in that it captures face images by simultaneously using an infrared camera and a still camera, determines whether a current face is a forged face by analyzing the characteristics of an input infrared image, and performs user authentication using a photorealistic image captured by visible light if it is determined that the current face is not a forged face, thus improving the reliability and security of a face detection device.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings which form a part hereof.

Figure 1:
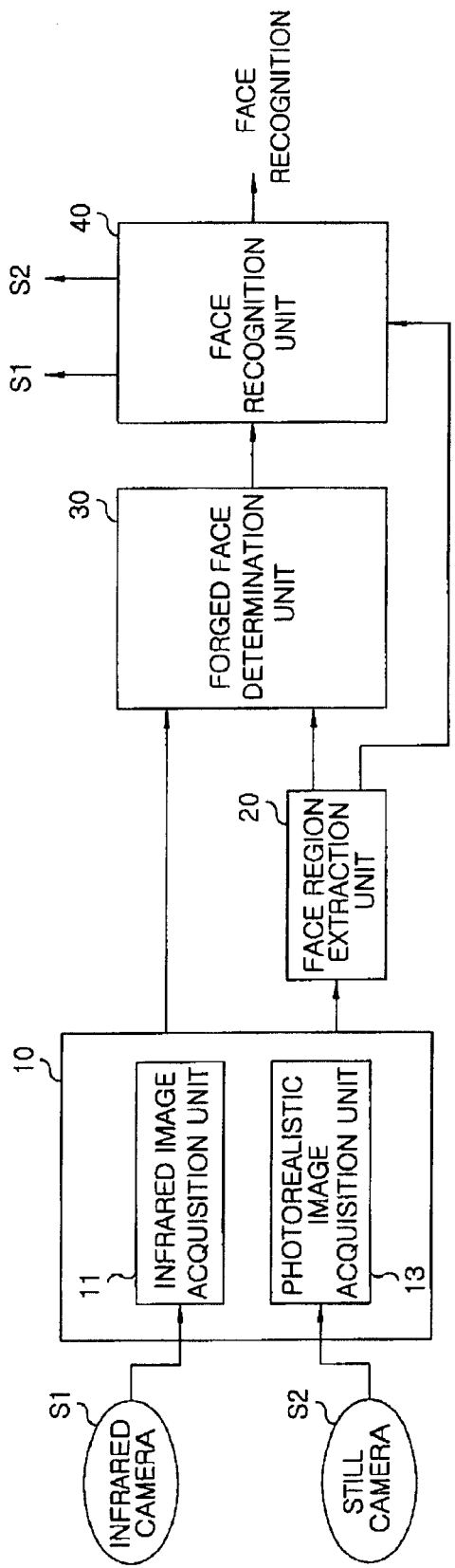
FIG. 1 is a block diagram showing an apparatus for detecting a forged face using an infrared image in accordance with an embodiment of the present invention.

FIG. 1 is a block diagram showing an apparatus for detecting a forged face using an infrared image in accordance with an embodiment of the present invention. The forged face detection apparatus includes an image acquisition unit 10, a face region extraction unit 20, a forged face determination unit 30, and a face recognition unit 40.

The image acquisition unit 10 includes an infrared image acquisition unit 11 and a photorealistic image acquisition unit 13.

The infrared image acquisition unit 11 acquires an infrared image captured by an infrared camera S1 to provide it to the forged face determination unit 30.

The photorealistic image acquisition unit 13 acquires a photorealistic image captured by a still camera S2 to provide it to the face region extraction unit 20.

The face region extraction unit 20 extracts a face region from the photorealistic image input from the photorealistic image acquisition unit 13 by applying a component-based image processing technique, or pattern recognition technique using Adaboost or a support vector machine (hereinafter referred to as an 'SVM') to the photorealistic image, and provides extracted face region information to the forged face determination unit 30.

Figure 2:
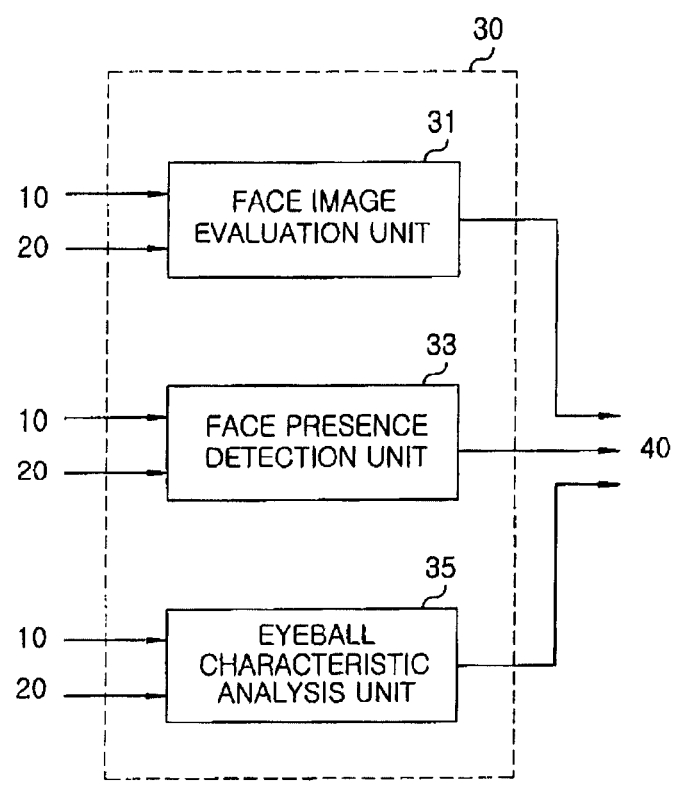
FIG. 2 is a detailed block diagram showing the forged face determination unit shown in FIG. 1.

As shown in the detailed block diagram in FIG. 2, the forged face determination unit 30 includes a face image evaluation unit 31 for evaluating the quality characteristics of the infrared image, a face presence detection unit 33, and an eyeball characteristic analysis unit 35.

The face image evaluation unit 31 evaluates the quality, i.e., clearness, of a region in the infrared image by using sharpness technique, the region of the infrared image corresponding to the face region extracted and input from the face region extraction unit 20. When, as a result of the evaluation, a clearness degree of the infrared image region is less than a preset clearness value, the face image evaluation unit 31 determines a current face to be a forged face, and provides the determination result to the face recognition unit 40. In contrast, when, as a result of the evaluation, the clearness degree of the face region satisfies the preset clearness value, the face image evaluation unit 31 determines the current face to be a non-forged face, and provides the determination result to the face recognition unit 40.

The face presence detection unit 33 detects, based on characteristics of the infrared image indicating that a facial shape is not visualized in a case of the infrared image captured from the forged face, whether a facial shape is present or not by applying the pattern recognition technology to the face region. When, as a detection result, a facial shape is not present, the face presence detection unit 33 determines the current face to be a forged face, and provides the determination result to the face recognition unit 40. In contrast, when, as a result of the detection, a facial shape is present, the face presence detection unit 33 determines the current face to be a non-forged face, and provides the determination result to the face recognition unit 40.

The eyeball characteristic analysis unit 35 compares preset eyeball regions and an eyeball region of the infrared image input from the infrared image acquisition unit 11, the preset eyeball region being provided by detecting eyeball regions from actual infrared images of various users in advance. When, as a result of the comparison, the eyeball region of the input infrared image is not identical to any of the preset eyeball regions, the eyeball characteristic analysis unit 35 determines the current face to be a forged face, and provides the determination result to the face recognition unit 40. In contrast, when, as a result of the analysis, the eyeball region of the infrared image is identical to one of the preset eyeball regions, the eyeball characteristic analysis unit 35 determines the current face to be a non-forged face, and provides the determination result to the face recognition unit 40.

The face recognition unit 40 performs face recognition on the face region input from the face region extraction unit 20, depending on the determination results input from the forged face determination unit 30 when the determination results indicate that the current face is a non-forged face. In contrast, the face recognition unit 40 does not perform face recognition and may perform control such that the current face again is captured again, when the determination results input from the forged face determination unit 30 indicate that the current face is a forged face.

Accordingly, the present invention captures face images by simultaneously using an infrared camera and a still camera, determines whether a current face is a forged face by analyzing the characteristics of an input infrared image, and performs user authentication using a photorealistic image captured by visible light if it is determined that the current face is a non-forged face, thus solving a plurality of problems in the prior art in which it is difficult to distinguish actual face information from forged face information using existing face recognition methods, there is a limitation due to the use of expensive equipment, and a user is inconvenienced.

Hereinafter, a method for detecting a forged face by using the above described apparatus for detecting a forged face in accordance with the present embodiment will be described below.

Figure 3:
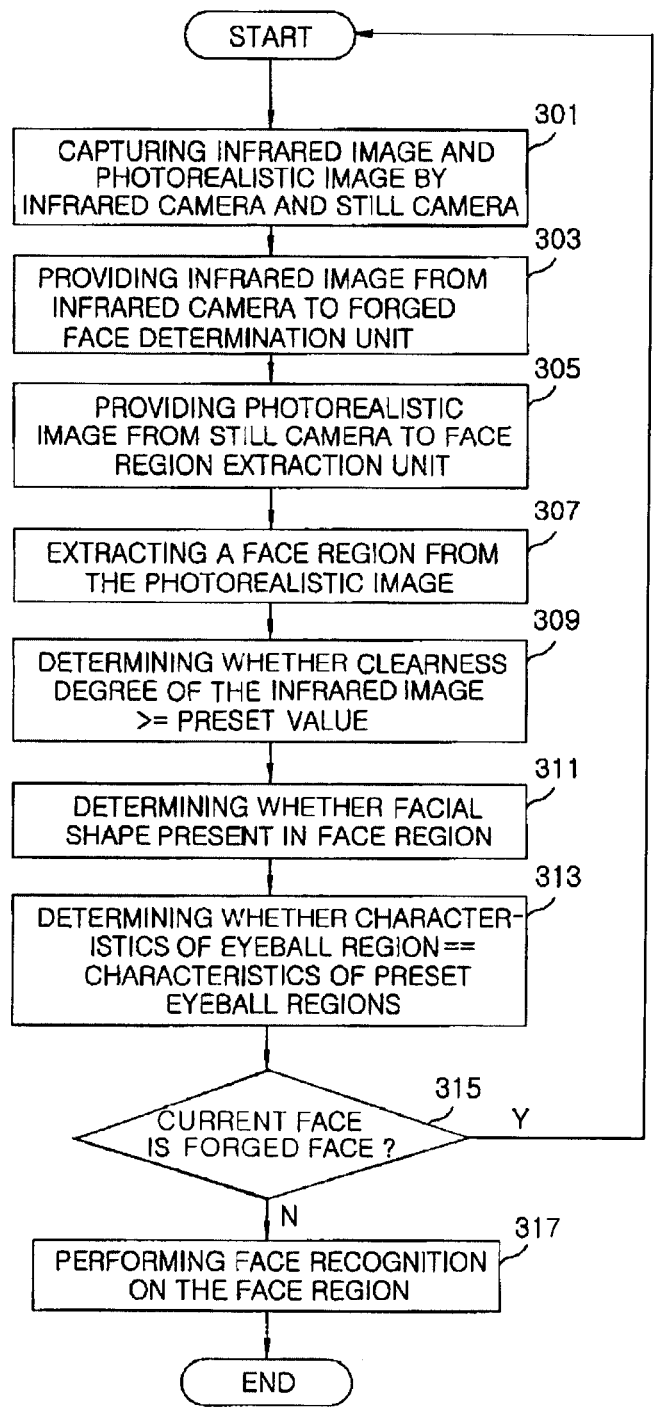
FIG. 3 is a flowchart sequentially showing the steps of a method of detecting a forged face using an infrared image in accordance with an embodiment of the present invention.

FIG. 3 is a flowchart sequentially showing steps of the method for detecting a forged face using an infrared image in accordance with the present invention.

First, an infrared image and a photorealistic image are respectively captured by the infrared camera S1 and the still camera S2 at step S301. Here, the infrared image and photorealistic image may also be captured by one camera which is configured to obtain both images by using visible light and infrared light.

Then, the infrared image acquisition unit 11 in the image acquisition unit 10 acquires the infrared image from the infrared camera S1 to provide the infrared image to the forged face determination unit 30 at step S303. The photorealistic image acquisition unit 13 acquires the photorealistic image from the still camera S2 to provide the photorealistic image to the face region extraction unit 20 at step S305.

Next, the face region extraction unit 20 extracts a face region from the photorealistic image input from the photorealistic image acquisition unit 13 by applying a component-based image processing technique, or pattern recognition technology using Adaboost or SVM, to the photorealistic image at step S307, and provides the extracted face region to the forged face determination unit 30.

Then, the face image evaluation unit 31 in the forged face determination unit 30 evaluates the quality of the region in the infrared image which corresponds to the face region extracted by and input from the face region extraction unit 20 by using sharpness technique at step S309. That is, at step S309, if the clearness degree of the infrared image region is less than a preset clearness value, the face image evaluation unit 31 determines the current face to be a forged face and provides the determination result to the face recognition unit 40. If the clearness of the infrared image region is equal to or greater than the preset clearness value, the face image evaluation unit 31 determines the current face to be a non-forged face and provides the determination result to the face recognition unit 40.

Figure 4A:
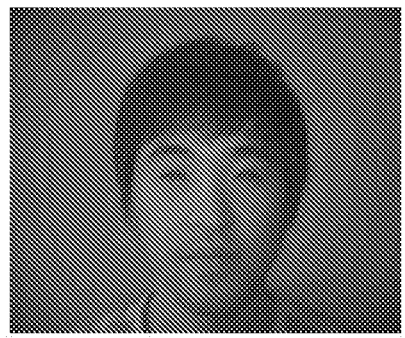
FIGS. 4A to 4C are diagrams showing a photorealistic image and infrared images.
Figure 4B:
Figure 4C:

For example, FIGS. 4A to 4C are diagrams showing infrared images captured by the infrared camera S1. When the image qualities of the respective infrared images shown in FIG. 4A to 4C are evaluated by using sharpness technique, the infrared images in FIG. 4B and 4C have less clearness than that in FIG. 4A and face characteristics thereof are not properly presented. Accordingly, faces shown in FIGS. 4B and 4C are determined to be forged faces.

Next, the face presence detection unit 33 of the forged face determination unit 30 detects whether a facial shape is present or not by applying Adaboost or SVM technology to the face region extracted by and input from the face region extraction unit 20, on the basis of the characteristics of the infrared image input from the infrared image acquisition unit 11 at step S311. That is, at step S311, if a facial shape is not present, the face presence detection unit 33 determines the current face to be a forged face and provides the determination result to the face recognition unit 40. If a facial shape is present, the face presence detection unit 33 determines the current face to be a non-forged face, and provides the determination result of the determination to the face recognition unit 40.

In this case, in order to promptly detect the presence/non-presence of a facial shape, a region for detection is limited to the face region extracted by and input from the face region extraction unit 20, but, if necessary, the presence/non-presence of a facial shape may be detected by applying a face detection technique to the entire infrared image.

Next, at step S313, the eyeball characteristic analysis unit 35 in the forged face determination unit 30 compares preset eyeball regions and an eyeball region of the infrared image input from the infrared image acquisition unit 11, the preset eyeball region being provided by detecting eyeball regions from actual infrared images of various users in advance.

As a result of the analysis at step S313, if the eyeball region of the input infrared image does not have characteristics identical to one of the preset eyeball regions, the eyeball characteristic analysis unit 35 determines the current face to be a forged face, and provides the determination result to the face recognition unit 40. If the eyeball region of the input infrared image has characteristics identical to one of the preset eyeball regions, the eyeball characteristic analysis unit 35 determines the current face not to be a forged face and provides the determination results to the face recognition unit 40.

At step S315, if the determination results indicate that the current face is not a forged face, the face recognition unit 40 performs face recognition on the face region input from the face region extraction unit 20 at step S317. Otherwise, the current face is captured again by the infrared camera S1 and the still camera S2 at step S301 without performing the face recognition.

As described above, the present invention captures face images by simultaneously using an infrared camera and a still camera, determines whether a current face is a forged face by analyzing the characteristics of an input infrared image, and performs user authentication using a photorealistic image captured by visible light if it is determined that the current face is not a forged face, thus improving the reliability and security of a face detection device.

While the invention has been shown and described with respect to the preferred embodiments, it will be understood by those skilled in the art that various changes and modifications may be made without departing from the scope of the invention as defined in the following claims.

What is claimed is:

1. A method for detecting a forged face using an infrared image, comprising:
    acquiring a first infrared image and first photorealistic image of a current face captured by one camera or two cameras;
    extracting a face region from the first photorealistic image;
    analyzing the first infrared image, the analyzing comprising analyzing a quality characteristic of the first infrared image;
    determining whether the current face is a forged face or not based on a result of the analysis of the first infrared image; and
    performing a face recognition process on the extracted face region of the first photorealistic image separately from the first infrared image if it is determined that the current face is a non-forged face,
    wherein analyzing the quality characteristic of the first infrared image comprises:
    determining a clearness degree of a region of the first infrared image that corresponds to the extracted face region of the first photorealistic image using a sharpness value; and
    determining the current face to be a forged face or a non-forged face,
    wherein the current face is determined to be a forged face if, as a result of the determining the clearness degree, the clearness degree of the region in the first infrared image is less than a preset clearness value, and
    wherein the current face is determined to be a non-forged face if, as a result of the determining the clearness degree, the clearness degree of the region in the first infrared image is identical to or greater than the preset clearness value.

2. The method of claim 1, further comprising:
    capturing a second infrared image and a second photorealistic image through the one camera or the two cameras without performing the face recognition process if it is determined that the current face is a forged face.

3. The method of claim 1, wherein analyzing the first infrared image further comprises:
    detecting characteristics indicating a facial shape in the first infrared image by using a pattern recognition technique; and
    analyzing eyeball characteristics of the first infrared image.

4. The method of claim 3, the method further comprising:
    determining, based on a result of the detecting, whether the facial shape is present or not in the first infrared image by applying the pattern recognition technique; and
    determining the current face to be a forged face if, as a result of the detection, the facial shape is not present, and determining the current face to be a non-forged face if, as a result of the detection, the facial shape is present.

5. The method of claim 4, wherein the pattern recognition technique uses Adaboost or a support vector machine.

6. The method of claim 3, wherein analyzing the eyeball characteristics comprises:
    comparing an eyeball region of the first infrared image with preset eyeball regions; and
    determining the current face to be a forged face if, as a result of the comparison, the eyeball region of the first infrared image does not include characteristics identical to corresponding characteristics of the preset eyeball regions, and determining the current face to be a non-forged face if, as a result of the comparison, the eyeball region of the infrared image includes characteristics identical to the corresponding characteristics of at least one of the preset eyeball regions.

7. An apparatus for detecting a forged face using an infrared image, comprising:
    an image acquisition unit configured to acquire a first infrared image and a first photorealistic image of a current face captured by one camera or two cameras;
    a face region extraction unit configured to extract a face region from the first photorealistic image;

a forged face determination unit configured to determine, based on an analysis of a quality characteristic of the first infrared image, whether the current face is a forged face; and a face recognition unit configured to perform face recognition on the first extracted face region of the photorealistic image separately from the first infrared image if it is determined that the current face is a non-forged face, wherein the forged face determination unit comprises:

a face image evaluation unit configured to determine a clearness degree of a region in the first infrared image corresponding to the extracted face region by using a sharpness value and to determine the current face to be a forged face if the clearness degree of the region in the first infrared image is less than a preset clearness value and to determine the current face to be a non-forged face if the clearness degree of the region in the first infrared image is identical to or greater than the preset clearness value;

a face presence detection unit configured to detect characteristics of the first infrared image indicating a facial shape, determine whether the facial shape is present or not by applying a pattern recognition technique, and determine the current face to be a forged face if the facial shape is not present and determine the current face to be a non-forged face if the facial shape is present; and an eyeball characteristic analysis unit configured to compare an eyeball region of the first infrared image with preset eyeball regions, and to determine the current face to be a forged face if the eyeball region of the first infrared image does not include a characteristic identical to a corresponding characteristic of the preset eyeball regions and to determine the current face to be a non-forged face if the eyeball region of the first infrared image includes a characteristic identical to the corresponding characteristic of at least one of the preset eyeball regions.

8. The apparatus of claim 7, wherein when the forged face determination unit determines that the current face is a forged face, a second infrared image and a second photorealistic image of the current face are captured using the one camera or the two cameras without performing face recognition by the face recognition unit.

9. The apparatus of claim 7, wherein the pattern recognition technique uses Adaboost or a support vector machine.

10. The method of claim 3, wherein detecting the characteristics indicating the facial shape is performed on a region of the first infrared image that corresponds to the extracted face region of the photorealistic image.

11. The method of claim 1, wherein the first infrared image is acquired by a near infrared camera.

12. The apparatus of claim 7, wherein the first infrared image is acquired by a near infrared camera.

* * * * *